United States Patent [19]

Breault et al.

[11] Patent Number: 4,574,112

[45] Date of Patent: Mar. 4, 1986

[54] COOLING SYSTEM FOR ELECTROCHEMICAL FUEL CELL

[75] Inventors: Richard D. Breault, Coventry; Richard D. Sawyer, Canton; Thomas E. DeMarche, New Haven, all of Conn.

[73] Assignee: United Technologies Corporation, Hartford, Conn.

[21] Appl. No.: 564,989

[22] Filed: Dec. 23, 1983

[51] Int. Cl.[4] ............................................. H01M 8/24
[52] U.S. Cl. ........................................ 429/26; 429/120
[58] Field of Search ................................. 829/26, 120

[56] References Cited

U.S. PATENT DOCUMENTS

| | | | |
|---|---|---|---|
| 754,969 | 3/1904 | Burt | 429/120 |
| 3,321,334 | 5/1967 | Palmer | 429/26 |
| 3,554,809 | 1/1971 | Craft | 429/26 |
| 4,310,605 | 1/1982 | Early et al. | 429/26 |
| 4,407,904 | 10/1983 | Uozumi et al. | 429/26 |

OTHER PUBLICATIONS

Gas Research Institute(GRI), On-Site Fuel Cell Power Plant Technology Development Program, Annual Report, Jan. 81–Dec. 81.

*Primary Examiner*—Donald L. Walton
*Attorney, Agent, or Firm*—Gene D. Fleischhauer

[57] ABSTRACT

A cooling system 24 for an electrochemical cell stack 12 is disclosed. Various construction details which avoid plugging of the cooling system during long term operation with a cooling fluid having dissolved species and suspended particles, such as water, are discussed. The cooling system includes spaced apart cooler assemblies 30. Conduits 32 for supplying cooling fluid to the cooler assemblies include sets of cooling tubes 74 in serial flow communication.

11 Claims, 7 Drawing Figures

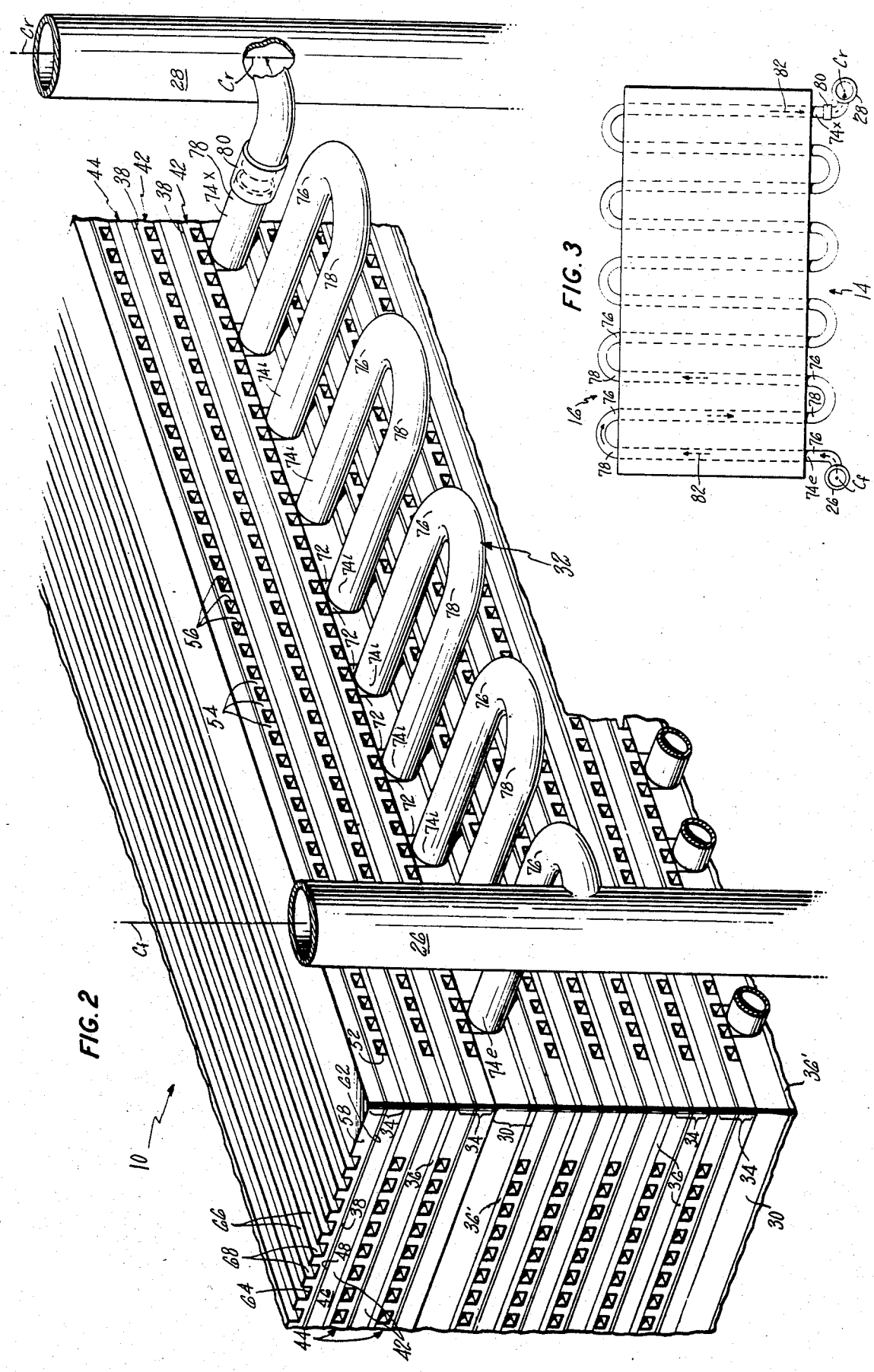

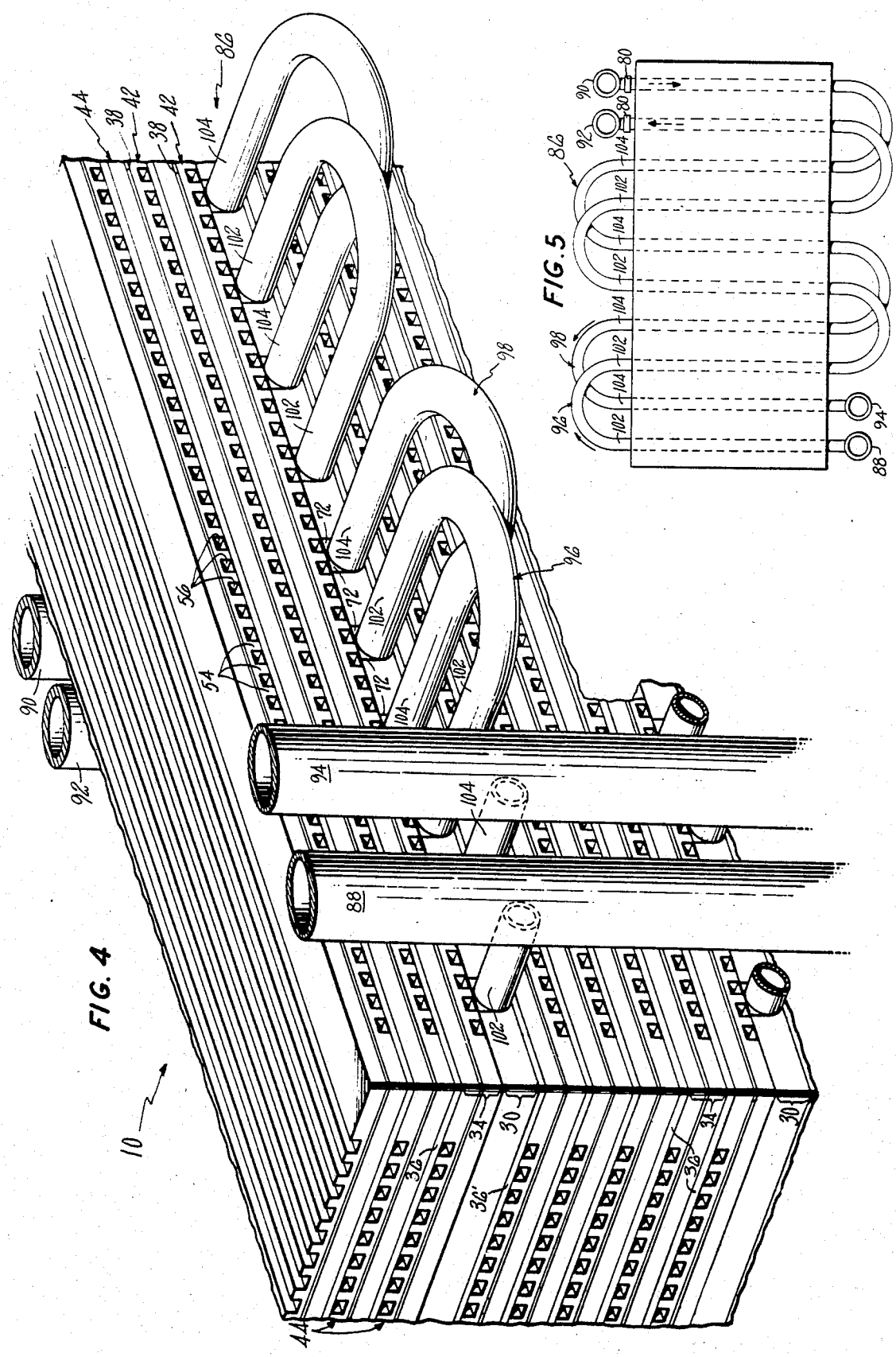

COOLING SYSTEM FOR ELECTROCHEMICAL FUEL CELL

TECHNICAL FIELD

This invention relates to electrochemical cells, and more particularly to a cooling system for electrochemical cells joined together in an electrochemical cell stack.

BACKGROUND

Electrochemical cells, such as fuel cells, consume reactant gases to electrochemically produce a reactant product and electrical power. Waste heat is a by-product of the electrochemical reaction. A cooling system is provided for removing the waste heat to maintain the temperature of all cells at a uniform level which is consistent with the properties of the material used in the fuel cell and the operating characteristics of the fuel cell.

Examples of cooling systems used in electrochemical fuel cells are shown in the following issued patents, the material in which is incorporated herein by reference: U.S. Pat. No. 4,245,009 issued to Guthrie entitled "Porous Coolant Tube Holder for Fuel Cell Stack"; U.S. Pat. No. 3,969,145 issued to Grevstad et alium entitled "Fuel Cell Cooling System Using A Non-dielectric Coolant"; U.S. Pat. No. 4,233,369 issued to Breault et alia entitled "Fuel Cell Cooler Assembly and Edge Seal Means Therefor" and U.S. Pat. No. 4,269,642 issued to De Casperis et alia.

As shown in U.S. Pat. No. 4,233,369 issued to Breault et alia, cooler assemblies are disposed in the fuel cell stack for cooling the stack. Cooling fluid from a supply chamber is supplied to the cooler assemblies by a feed tube. The cooling fluid is returned from the cooler assemblies to the supply chamber via a return tube. An inlet header is in flow communication with the feed tube and an outlet header is in flow communication with the return tube. A plurality of cooling tubes at each cooler assembly extend in parallel between the inlet header and the outlet header and are disposed in the cooler assembly. The cooler assembly is adapted by channels to receive the cooling tubes.

The outlet of power by the stack may be increased by adding electrochemical cells to the stack. The additional cells increase the length of the cell stack. As the length of the cell stack increases, the feed tube and return tube are lengthened to bring cooling fluid to the additional cooler assemblies. The increase in the length of the tubes causes an increase in the loss of pressure experienced by the fluid as the fluid flows between the first header and the last header. Proper sizing of the feed and return tubes can produce approximately equal overall pressure losses in both tubes. As the tubes become longer, the different flow characteristics in each tube results in unequal pressure gradients over some regions and causes, in some cases, an inadequate amount of flow to some headers and an excessive amount of flow to other headers. This condition of unequal flows between headers is referred to as flow maldistribution. Cooler to cooler flow maldistribution can also result from variations in head loads between cooler assemblies as a result of variations in cell performance and as a result of variations in flow cross-sectional areas due to the deposition of dissolved species and suspended particulates. Flow maldistribution can also occur within a cooler whose tubes are aligned in a parallel flow configuration as described above due to variations in local heat loads which results from variations in current density across the cell.

One approach to solving the problem of flow maldistribution is to increase the field resistance in the assembly, that is the flow resistance between the center of the feed tube and the center of the return tube, such that variations in flow resistance between the first header and the last header are insignificant in comparison to the field resistance. Flow resistance is increased, for example, by an orifice which has a diameter which is much smaller than the diameter of the tubes. Recent experiences have shown that such small orifices are prone to plugging in systems using a coolant, such as water because of dissolved species or particles in the coolant which form deposits on the walls of the orifices. One solution is to provide a cooling fluid which is treated to remove the dissolved species and particles. Nevertheless, there are many situations in which the cleanliness of such coolant is limited by economic or physical reasons.

Accordingly, a requirement exists for a cooling system which avoids the problem of plugging and, at the same time, avoids the problem of flow maldistribution between cooler assemblies.

SUMMARY OF INVENTION

According to the present invention, a cooling system having cooler assemblies for an electrochemical cell stack includes a feed tube, a return tube and a plurality of conduits for cooling fluid extending between the tubes, each of the conduits being formed of a set of cooling tubes serially connected one to the other in serial flow communication to form a tortuous path for the cooling fluid through the associated cooler assembly.

A primary feature of the present invention is a system having a plurality of cooler assemblies for removing heat from the heat producing cells of an electrochemical cell stack. The system includes a supply tube and a return tube. Another feature is a plurality of conduits extending between the supply tube and the return tube. Each conduit is disposed in an associated cooler assembly. Each conduit is formed of a set of cooling tubes. Each cooling tube extends transversely across the cell stack from one side of the cooler assembly to the other. The tubes are in fluid communication with the feed tube and the return tube and are in serial flow communication with each other to form a tortuous flow path for the cooling fluid. A feature is the flow resistance characteristic of the conduit which results from the tortuous nature of the flow path for the cooling fluid. A feature of one embodiment is the hydraulic diameter of the conduit between the center of the return tube and the center of the feed tube, the minimum value of which is approximately equal to three fourths of the average hydraulic diameter of the cooling tubes. In one embodiment, a feature is a cooling system having two sets of conduits. Each set of conduits has a set of cooling tubes at each cooler assembly interdigitated with a set of cooling tubes from the other set of conduits. In one embodiment, a feature is a continuous tube which extends from the feed tube to the return tube and a dielectric connector that joins the conduit to the return tube.

A primary advantage of the present invention is the ability of the cooling system to use cooling fluid which contains species and particles suspended and dissolved in the fluid, such as water, for extended periods of time without failure of the cooling system. This results from avoiding the use of small diameter flow control orifices while preventing an undesirable distibution of cooling fluid between sets of cooling tubes by using the flow resistance characteristic of the cooling tubes to balance the distribution of flow. In one embodiment, an advantage is the reliability and simplicity of construction which results from eliminating cooling headers connected to the feed tube and the return tube and multiple connections between the headers and tubes by employing a single conduit having serially communicating cooling tubes, each tube of which flows all of the cooling fluid which enters the conduit. In one embodiment, an advantage is the uniformity in temperature gradients and heat flux between the heat producing cells and the cooler assembly which results from providing two conduits having interdigitated cooling tubes in a counter flow relationship.

The foregoing features and advantages of the present invention will become more apparent in the light of the following detailed description of the best mode for carrying out the invention and in the accompanying drawing.

BRIEF DESCRIPTION OF DRAWINGS

FIG. 2 is an enlarged view of a portion of the fuel cell stack assembly shown in FIG. 1.

FIG. 3 is a schematic illustration of a cooler assembly of the fuel stack shown in FIG. 1.

FIG. 4 is an alternate embodiment of the fuel cell stack assembly shown in FIG. 1.

FIG. 5 is a schematic illustration of a cooler assembly of the fuel cell stack shown in FIG. 4.

BEST MODE FOR CARRYING OUT INVENTION

Figure 1:
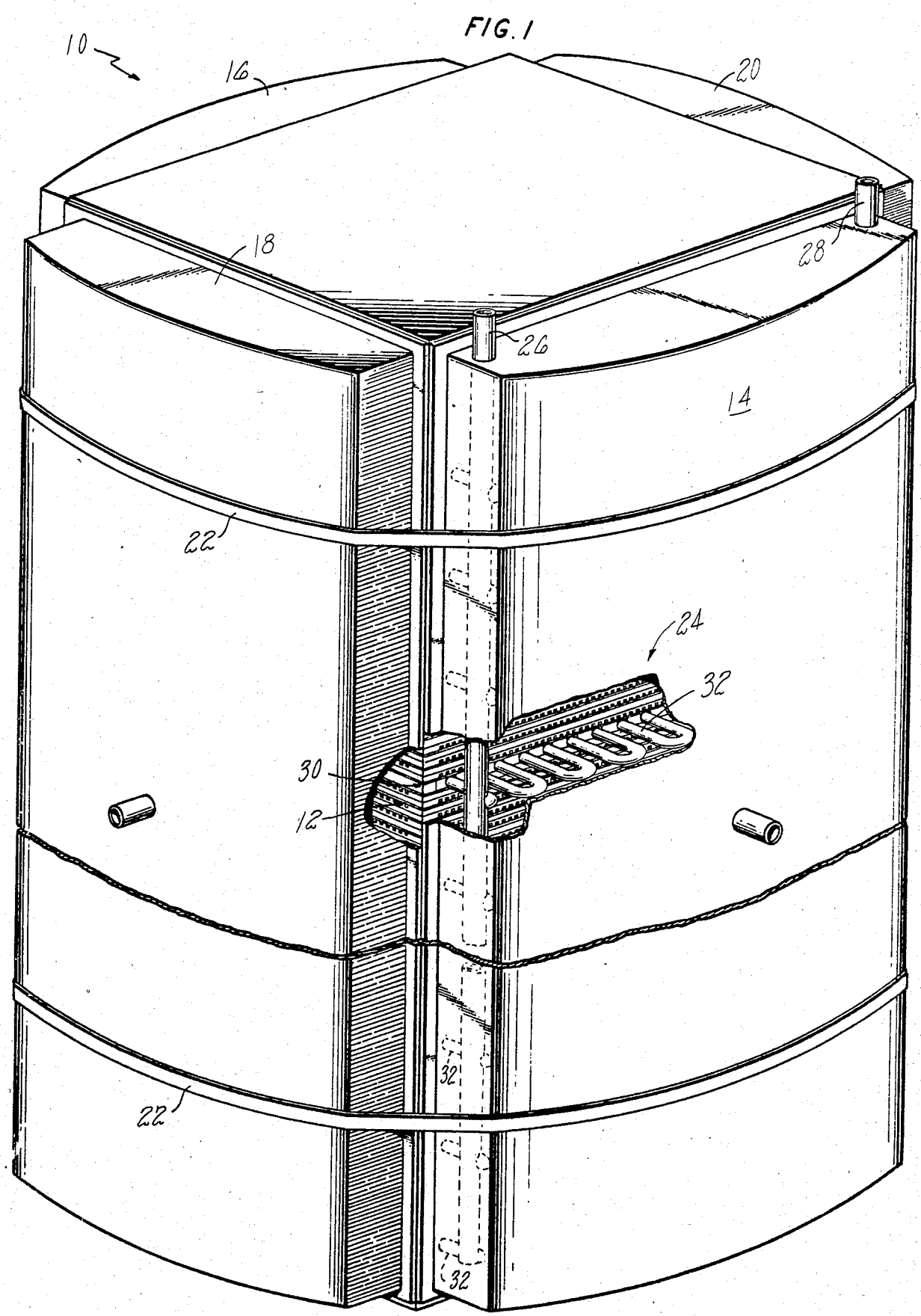
FIG. 1 is a partial perspective view of a fuel cell stack assembly with a part of the assembly broken away to show a portion of the cooling system.

FIG. 1 shows a portion of an electrochemical cell stack assembly 10 of the fuel cell type. The stack assembly includes a fuel cell stack 12 and four reactant gas manifolds 14, 16, 18 and 20. Each reactant gas manifold covers one of the surfaces of the stack. Manifold 14 is the inlet manifold for fuel. Manifold 16 is the outlet manifold for fuel. Manifold 18 is the inlet manifold for the oxidant, air. Manifold 20 is the outlet manifold for the oxidant. These manifolds are pressed tightly in sealing relationship against the faces of the stack by a plurality of bands 22.

The fuel cell stack assembly 10 includes a cooling system 24 for ducting cooling fluid from a source of fluid (not shown) to a discharge region (not shown). The cooling system includes a means for circulating the cooling fluid, a feed tube 26, a return tube 28 and a plurality of cooler assemblies as represented by the single cooler assembly 30. A plurality of conduits for cooling fluid extend between the tubes as represented by the single conduit 32. The conduits are regularly spaced along the length of the stack as represented by the phantom lines showing the conduits joined to the feed tube. Each conduit is disposed in an associated cooler assembly.

FIG. 2 shows a more detailed view of the fuel cell stack assembly 10 shown in FIG. 1. The fuel cell stack includes a plurality of fuel cells 34 arranged together to form the stack. A gas impervious separator plate 36 or a cooler assembly 30 extends between each pair of fuel cells. Each cooler assembly includes a gas impervious separator plate 36' which is identical to the separator plate 36 to provide a gas impervious layer. In this exemplary embodiment, the plates 36, 36' are 33 mils thick, about 20 inches long and about 20 inches wide.

The basic fuel cell construction is the same as that shown in and described in commonly owned U.S. Pat. No. 4,115,627 issued to Christner et alia entitled "Electrochemical Cell Comprising A Ribbed Electrode Substrate", which is incorporated herein by reference. Each fuel cell 34 includes a thin matrix layer 38 for retaining electrolyte. The matrix layer has an anode electrode 42 disposed on one side and a cathode electrode 44 disposed on the other side. A phosphoric acid electrolyte is disposed in the matrix layer between the anode and cathode electrodes. The anode electrode includes a substrate 46 which is approximately eighty mils thick, is fibrous and is porous to the passage of gas. The substrate has a flat surface 48 which faces the matrix layer 38. A thin layer of catalyst (not shown) is disposed on the flat surface. The catalyst layer is preferably of a thickness of two to five mils. The substrate has a second surface 52. A plurality of ribs 54 extend outwardly from the second surface and are spaced apart leaving a plurality of grooves 56 therebetween. These grooves extend across the cell to place the fuel inlet manifold 14 in fluid communication with the fuel outlet manifold 16.

The cathode electrode 44 is similar in construction to the anode electrode. The cathode electrode has a cathode substrate 58. A thin layer of catalyst is disposed on the flat surface 62 (not shown). The cathode has a second face 64. A plurality of ribs 66 extend from the second face and are spaced apart to define a plurality of grooves 68 for placing the air inlet manifold 18 in flow communication with the outlet manifold 20 in a direction perpendicular to the fuel flow across the anode electrode 42.

Each cooler assembly 30 is disposed between a pair of fuel cells 12. The cooler assembly has a plurality of channels 72 extending through the assembly which adapt the cooler assembly to receive an associated conduit 32. The conduit extends between the feed tube 26 and the return tube 28. Each conduit includes a set of cooling tubes 74 disposed in the channels of the cooler assembly. Each set of tubes includes an entrance cooling tube 74e, at least one intermediate coolant tube 74i and an exit cooling tube 74x. Each coolant tube filled with cooling fluid has an inlet 76, an outlet 78 and an average hydraulic diameter $D_t$ between the inlet and the outlet. The average hydraulic diameter is equal to four times the cross-sectional flow area of the tube divided by the wetted perimeter of the tube.

In each conduit, the inlet 76 of the entrance tube 74e is joined to and is in flow communication with the feed tube 26. The outlet 78 of the exit tube 74x is joined to and is in flow communication with the return tube 28. In the embodiment shown, a dielectric connector 80 such as a polytetrafluoroethylene hose, is used to join the outlet of the exit tube to the return tube to interrupt the electrical continuity of the conduit. A second dielectric connector 80' (not shown) is used to join the inlet of the entrance tube to the feed tube. The inlet 76 of each intermediate tube is joined to and is in flow communication with the outlet 78 of an adjacent tube.

As shown in FIG. 3, the outlets and inlets of the tubes in the fuel outlet manifold 16 are connected in the same way as the outlets and inlets shown in the fuel inlet manifold 14. Thus, the cooling tubes 74 extending between the feed tube and the supply tube are serially connected in serial flow communication to provide a tortuous flow path for cooling fluid through the assembly to the return tube.

The feed tube 26, the return tube 28 and each conduit 32 define a flow path 82 for cooling fluid which extends through the cooler assembly 30. The flow path, filled with cooling fluid, extends from the center $C_f$ of the feed tube to the center $C_r$ of the return tube and has a minimum hydraulic diameter $D_f$. The minimum hydraulic diameter of the flow path is equal to or greater than three fourths of the average hydraulic diameter $D_t$ of the coolant tubes, ($D_f \geq 0.75\ D_t$) to avoid plugging at the minimum hydraulic diameter of the conduit during long term operative conditions employing a coolant having dissolved species or particles.

Figure 6:
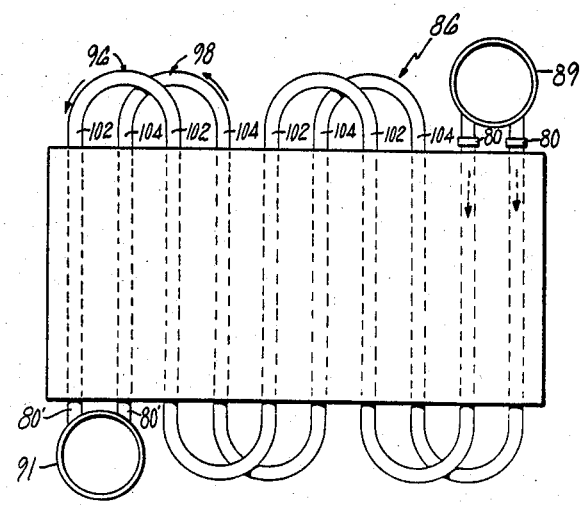
FIG. 6 is an alternate embodiment of the fuel cell stack assembly shown in FIG. 5.
Figure 7:
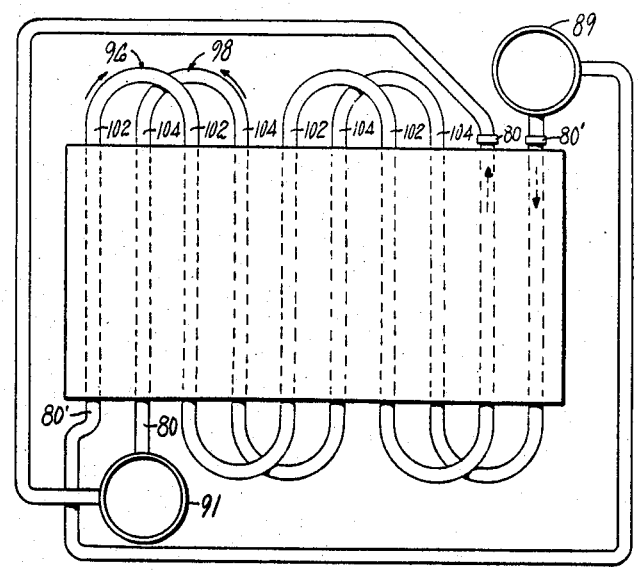
FIG. 7 is an alternate embodiment of the fuel cell stack assembly shown in FIG. 4.

FIGS. 4 and 5 show an alternate embodiment 86 of the cooling system 24 for the electrochemical cell stack shown in FIG. 2 that has two sets of conduits for each cooler assembly. The cooling system 86 has first and second feed tubes 88, 90 and first and second return tubes 92, 94. A plurality of first conduits, as represented by the single first conduit 96, extends between the first feed tube and the first return tube. A plurality of second conduits, as represented by the single second conduit 98, extends between the second feed tube and the second return tube. Each first conduit includes a first set of coolant tubes 102 connected as are the coolant tubes shown in the FIG. 2 embodiment. Each second conduit includes a second set of coolant tubes 104 connected as are the coolant tubes shown in the FIG. 2 embodiment. Thus, in each cooler assembly, a second set of coolant tubes 104 is disposed in channels 72 adjacent to channels 72 containing the first set of cooling tubes such that the second set of cooling tubes is interdigitated with the first set of cooling tubes. The first feed tube 88 is located next to the second return tube 94 and the first return tube 92 is located next to the second feed tube 90, such that the flow of coolant in the two sets of tubes is in a counterflow relationship. As will be realized, interchanging the positions of the feed tube 90 with the return tube 94 will result in a co-flow construction causing the fluid to flow together in parallel along a serpentine path. In addition, both the counterflow and co-flow constructions might have both conduits connected to the same feed tube 89 and both conduits connected to the same return tube 91 as shown respectively in FIG. 6 and FIG. 7.

During operation of the fuel cell stack assembly 12, hydrogen (fuel) and air (oxidant) are electrochemically combined in the fuel cell stack 12 to produce electrical power and waste heat. The heat is transferred through the fuel cells 34 to the cooler assemblies 30. In this embodiment, the stack has about two-hundred and seventy fuel cells and has a cooler assembly after every fifth cell. Coolant fluid is flowed via the feed tube 26 to the conduit 32 passing through the cooler assemblies and thence to the return tube 28. Heat is transferred within the cooler assembly to the cooling fluid flowing within the tubes. Each coolant tube receives the entire flow of cooling fluid passing through the conduit and has a larger diameter to accommodate the flow rate as compared with tubes extending in parallel. The larger flow rate and surface area of the cooling tubes increases the capacity of the cooling tubes to remove heat. The flow resistance characteristic of the long tortuous flow path 82 through the tubes is much higher than the flow resistance characteristic of tubes of shorter length that extend in parallel. As a result the field pressure drop from the entrance 76 of the conduit to the outlet 78 of the conduit is high in comparison to the difference pressure along the feed tube to insure that each cooler assembly receives the allotted amount of cooling fluid. Small variations in the flow rate of cooling fluid will exist between conduits but, because of the large mass flow of cooling fluid through each coolant tube, an unacceptable distribution of the cooling fluid between cooler assemblies is avoided. Because the flow path extending from the center of the feed tube to the center of the return tube sees no hydraulic diameters less than three fourths of the hydraulic diameter of the cooling tubes, it is believed that a cooling system using a cooling fluid having dissolved and suspended particles and species will not experience blockages of the conduit even after long term operation of the stack, that is, after operation of the stack for several thousand hours.

As will be realized, the coolant tubes might be fabricated independently and joined integrally to form a single tube or might be formed from a single long piece of tubing. In either event, the number of connections is reduced as compared with systems which use headers and tubes in a parallel flow arrangement. As a result the possibility of leakage at a connection is reduced by reducing the number of connections.

During operation of the cooling system shown in FIG. 3, cooling fluid is flowed in the two different conduits in opposite directions through the cooler assembly. Any heating of the coolant in one conduit which occurs before it reaches the end of the conduit is offset by cooler fluid in the second conduit being brought in from the other side. This minimizes variations in temperatures which might occur in the cells because of heating of the cooling fluid in the first conduit as the fluid passes through the cooler assembly.

Although the invention has been shown and described with respect to detailed embodiments thereof it should be understood by those skilled in the art that various changes in form and detail thereof may be made without departing from the spirit and the scope of the claimed invention.

We claim:

1. In an electrochemical cell stack of the type which engages a first reactant inlet manifold, a first reactant outlet manifold, a second reactant inlet manifold and a second reactant outlet manifold and further has a first face which adapts the stack to engage the first reactant inlet manifold, a second face which adapts the stack to engage the first reactant outlet manifold, a third face which adapts the stack to engage the second reactant enlet manifold and a fourth face which adapts the stack to engage the second reactant outlet manifold, the electrochemical cell stack further including a plurality of heat producing cells and a cooling system for the cells, the cooling system including a plurality of cooler assemblies spaced from the other, each of which is disposed between a pair of heat producing cells and is adapted by channels extending therethrough to receive cooling tubes, the cooling system further including a means for circulating cooling fluid which includes a feed tube and a return tube, the improvement which comprises:

a plurality of conduits, each conduit extending in an associated cooler assembly between the feed tube and the return tube to form a flow path for cooling fluid which extends from the center of the feed tube to the center of the return tube and which has a minimum hydraulic diameter $D_f$, the conduit having a set of cooling tubes disposed in the channels of the cooler assembly, each tube having an inlet, an outlet, and an average hydraulic diameter $D_t$ between the inlet and the outlet, each set of tubes including an entrance cooling tube, at least one intermediate cooling tube, and an exit cooling tube;

wherein the minimum hydraulic diameter $D_f$ of each flow path extending from the center of the feed tube to the center of the return tube is equal to or greater than three fourths of the average hydraulic diameter of said cooling tubes $D_t$ to avoid plugging of the flow path at the minimum hydraulic diameter of the flow path under long term operative conditions, wherein the inlet of the entrance tube is joined to and is in flow communication with the feed tube, the outlet of the exit tube is joined to and is in flow communication with the return tube and the inlet of each intermediate tube is joined to and is in flow communication with the outlet of an adjacent tube such that the cooling tubes extending between the feed tube and the return tube are serially connected in serial flow communication to provide a tortuous flow path for cooling fluid through an associated cooler assembly which has a flow resistance characteristic that ensures a predetermined supply of cooling fluid to each cooler assembly, and wherein at least one entrance cooling tube is adjacent to the second face and extends across the stack between the third face and the fourth face.

2. The electrochemical cell stack of claim 1 wherein the outlet of each intermediate cooling tube is connected by a curved fitting to the inlet of an associated cooling tube.

3. The electrochemical cell stack of claim 2 wherein the cooling tubes are formed as an integral structure.

4. The electrochemical cell stack of claim 2 wherein the cross-sectional shape of at least one set of cooling tubes is circular.

5. The electrochemical cell stack of claim 4 wherein the stack includes a plurality of dielectric connectors each extending between the inlet of an associated entrance cooling tube and the feed tube and the outlet of an associated exit tube and the return tube to provide an electrically nonconductive connection between the conduit and both the exit tube and the feed tube.

6. The electrochemical cell stack of claim 1 wherein the set of cooling tubes are formed by a single, axially continuous piece of tubing having bends which connect the cooling tubes.

7. The electrochemical cell stack of claim 1 wherein the first reactant inlet and outlet manifolds are the oxidant inlet and outlet manifolds and the second reactant inlet and outlet manifolds are the fuel inlet and outlet manifolds.

8. In an electrochemical cell stack of the type including a plurality of heat producing cells and a cooling system for the cells, the cooling system including a plurality of cooler assemblies spaced one from the other, each of which is disposed between a pair of heat producing cells and is adapted by channels extending therethrough to receive cooling tubes, the cooling system further including a means for circulating cooling fluid which includes a first feed tube and a first return tube, the improvement which comprises:

a means for circulating cooling fluid which includes
a first plurality of conduits, each conduit extending in an associated cooler assembly between the first feed tube and the first return tube to form a first flow path for cooling fluid which extends from the center of the first feed tube to the center of the first return tube, the first flow path having a minimum hydraulic diameter $D_f$, the conduit having a set of cooling tubes disposed in the channels of the cooler assembly, each tube having an inlet, an outlet, and an average hydraulic diameter $D_t$ between the inlet and the outlet, each set of tubes including an entrance cooling tube, at least one intermediate cooling tube, and an exit cooling tube; and, a second feed tube for circulating cooling fluid, a second return tube for circulating cooling fluid, and, a second plurality of conduits, each conduit extending between the second feed tube and the second return tube to form a second flow path for cooling fluid which extends from the center of the second feed tube to the center of the second return tube, the second flow path having a minimum hydraulic diameter $D_f$, the conduit having a second set of cooling tubes disposed in the channels of the cooler assembly, each tube having an inlet, an outlet, and an average hydraulic diameter $D_t$ between the inlet and the outlet, each set of tubes including an entrance cooling tube, at least one intermediate cooling tube, and an exit cooling tube;

wherein the minimum hydraulic diameter $D_f$ of each flow path is equal to or greater than three fourths of the average hydraulic diameter of said cooling tubes $D_t$ to avoid plugging of the tubes at the minimum hydraulic diameter of the conduit under long term operative conditions;

wherein the inlet of the entrance tube of each conduit is joined to and is in flow communication with an associated feed tube, the outlet of the exit tube of each conduit is joined to and is in flow communication with an associated return tube, and the inlet of each intermediate tube is joined to and is in flow communication with the outlet of an adjacent tube such that the cooling tubes extending between the feed tube and the return tube are serially connected in serial flow communication to provide a tortuous flow path for cooling fluid through an associated cooler assembly which has a flow resistance characteristic that ensures a predetermined supply of cooling fluid to each cooler assembly;

wherein at each cooler assembly each tube of the associated second set of cooling tubes is disposed in the cooler assembly adjacent to a cooling tube of the first set of cooling tubes such that the cooling tubes of the second set alternate with cooling tubes of the first set in interdigitated fashion.

9. The invention as claimed in claim 8 wherein at least one cooler assembly has the entrance cooling tube of the first set adjacent to the exit cooling tube of the second set and the exit cooling tube of the first set adjacent to the entrance cooling tube of the second set such that the first conduit and the second conduit are adapted to flow cooling fluid in opposite directions.

10. In an electrochemical cell stack of the type including a plurality of heat producing cells and a cooling system for the cells, the cooling system including a plurality of cooler assemblies spaced one from the other, each of which is disposed between a pair of heat producing cells and is adapted by channels extending therethrough to receive cooling tubes, the cooling system further including a means for circulating cooling fluid which includes a first feed tube and a first return tube, the improvement which comprises:

a means for circulating cooling fluid which includes a first plurality of conduits, each conduit extending in an associated cooler assembly between the first feed tube and the first return tube to form a first flow path for cooling fluid which extends from the center of the first feed tube to the center of the first return tube, the first flow path having a minimum hydraulic diameter $D_f$, the conduit having a set of cooling tubes disposed in the channels of the cooler assembly, each tube having an inlet, an outlet, and an average hydraulic diameter $D_t$ between the inlet and the outlet, each set of tubes including an entrance cooling tube, at least one intermediate cooling tube, and an exit cooling tube; and, a second plurality of conduits, each conduit extending between the first feed tube and the first return tube to form a second flow path for cooling fluid which extends from the center of the first feed tube to the center of the first return tube, the second flow path having a minimum hydraulic diameter $D_f$, the conduit having a second set of cooling tubes disposed in the channels of the cooler assembly, each tube having an inlet, an outlet, and an average hydraulic diameter $D_t$ between the inlet and the outlet, each set of tubes including an entrance cooling tube, at least one intermediate cooling tube, and an exit cooling tube;

wherein the minimum hydraulic diameter $D_f$ of each flow path is equal to or greater than three fourths of the average hydraulic diameter of said cooling tubes $D_t$ to avoid plugging of the tubes at the minimum hydraulic diameter of the conduit under long term operative conditions;

wherein the inlet of the entrance tube of each conduit is joined to and is in flow communication with an associated feed tube, the outlet of the exit tube of each conduit is joined to and is in flow communication with an associated return tube, and the inlet of each intermediate tube is joined to and is in flow communication with the outlet of an adjacent tube such that the cooling tubes extending between the feed tube and the return tube are serially connected in serial flow communication to provide a tortuous flow path for cooling fluid through an associated cooler assembly which has a flow resistance characteristic that ensures a predetermined supply of cooling fluid to each cooler assembly;

wherein at each cooler assembly each tube of the associated second set of cooling tubes is disposed in the cooler assembly adjacent to a cooling tube of the first set of cooling tubes such that the cooling tubes of the second set alternate with cooling tubes of the first set in interdigitated fashion.

11. The invention as claimed in claim 10 wherein at least one cooler assembly has the entrance cooling tube of the first set adjacent to the exit cooling tube of the second set and the exit cooling tube of the first set adjacent to the entrance tube of the second set such that the first conduit and the second conduit are adapted to flow cooling fluid in opposite directions.

* * * * *